US011618336B2

(12) United States Patent
Hishida et al.

(10) Patent No.: US 11,618,336 B2
(45) Date of Patent: Apr. 4, 2023

(54) POWER TRANSFER UNIT, AND POWER TRANSFER SYSTEM

(71) Applicant: HONDA MOTOR CO., LTD., Tokyo (JP)

(72) Inventors: Motoki Hishida, Saitama (JP); Hakaru Sadano, Saitama (JP); Hiroyuki Kanazawa, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 179 days.

(21) Appl. No.: 16/726,795

(22) Filed: Dec. 24, 2019

(65) Prior Publication Data

US 2020/0231057 A1 Jul. 23, 2020

(30) Foreign Application Priority Data

Jan. 17, 2019 (JP) .............................. JP2019-006010

(51) Int. Cl.
*B60L 53/62* (2019.01)
*H02J 3/32* (2006.01)
(Continued)

(52) U.S. Cl.
CPC ............... *B60L 53/62* (2019.02); *B60L 53/16* (2019.02); *B60L 53/63* (2019.02); *B60L 53/65* (2019.02); *B60L 53/66* (2019.02); *H02J 3/322* (2020.01)

(58) Field of Classification Search
CPC ........ B60L 53/62; B60L 53/30; B60L 53/305; B60L 53/65; B60L 55/00; B60L 53/67; B60L 53/665; B60L 53/66; B60L 53/16; B60L 53/53; B60L 53/54; B60L 53/55; B60L 53/68; Y02T 90/10; Y02T 90/12; Y02T 90/14; Y02T 90/16; Y02T 90/167; Y02T 10/70; G06Q 50/06; H02J 3/381; H02J 2300/20; H02J 3/32; H02J 13/00;
(Continued)

(56) References Cited

U.S. PATENT DOCUMENTS 9,153,847 B2 * 10/2015 Harty .................... H01M 10/46
10,245,968 B2    4/2019 O'Connell
(Continued)

FOREIGN PATENT DOCUMENTS

JP     2007503191 A    2/2007
JP     2008142550 A    6/2008
(Continued)

OTHER PUBLICATIONS

Office Action issued for counterpart Japanese Application No. 2019-006010, issued by the Japan Patent Office dated Dec. 1, 2020 (drafted on Nov. 25, 2020).

*Primary Examiner* — Elim Ortiz

(57) ABSTRACT

A carriable power transfer unit that can be used for bidirectional power transmission between a power network and each of the plurality of vehicles provided with driving power sources is provided. The power transfer unit includes: a plurality of connecting portions that are attachable to and detachable from each of the plurality of vehicles, and are used for power transmission between the power transfer unit and each of the plurality of vehicles; and a control unit that controls bidirectional power transmission between the power network and each of the plurality of vehicles.

8 Claims, 9 Drawing Sheets

(51) Int. Cl.
  *B60L 53/65* (2019.01)
  *B60L 53/63* (2019.01)
  *B60L 53/66* (2019.01)
  *B60L 53/16* (2019.01)

(58) Field of Classification Search
  CPC ....... H02J 3/00; H02J 3/38; H02J 7/00; Y04S 40/12; Y04S 10/126; Y02B 90/20; H07J 7/00032; H07J 7/0034; H07J 7/0045; H07J 7/0047
  USPC ......... 307/9.1, 10.1, 43, 44, 45, 46, 48, 110; 320/104, 101, 109, 111, 113, 114, 115, 320/119, 127, 128, 125, 137, 138
  See application file for complete search history.

(56) References Cited

U.S. PATENT DOCUMENTS

| | | | | |
|---|---|---|---|---|
| 10,857,902 | B2* | 12/2020 | Goei | B60L 53/60 |
| 11,007,891 | B1* | 5/2021 | Kamal | H02J 13/00002 |
| 11,171,509 | B2* | 11/2021 | Lee | B60L 53/63 |
| 2005/0077881 | A1 | 4/2005 | Capp | |
| 2008/0150754 | A1 | 6/2008 | Quendt | |
| 2009/0115251 | A1* | 5/2009 | Nakamura | H01M 10/44 180/65.29 |
| 2011/0066309 | A1* | 3/2011 | Matsuoka | B60L 53/65 702/187 |
| 2011/0246252 | A1* | 10/2011 | Uesugi | G06Q 50/06 705/7.12 |
| 2011/0276194 | A1* | 11/2011 | Emalfarb | B60L 53/14 700/297 |
| 2011/0313603 | A1* | 12/2011 | Laberteaux | H02J 7/04 705/412 |
| 2012/0109409 | A1 | 5/2012 | Hara | |
| 2015/0088354 | A1 | 3/2015 | Kanayama | |
| 2016/0075244 | A1 | 3/2016 | JUN Im | |
| 2017/0250550 | A1* | 8/2017 | Miftakhov | H02J 7/0026 |
| 2018/0012164 | A1* | 1/2018 | Gopalakrishnan | G06Q 10/06313 |
| 2018/0186246 | A1* | 7/2018 | Kudo | H02J 3/008 |
| 2021/0221247 | A1* | 7/2021 | Daniel | H02J 7/34 |

FOREIGN PATENT DOCUMENTS

| | | | |
|---|---|---|---|
| JP | 2011120395 | A | 6/2011 |
| JP | 2012048286 | A | 3/2012 |
| JP | 5106508 | B2 | 12/2012 |
| JP | 5149753 | B2 | 2/2013 |
| JP | 2014093834 | A | 5/2014 |
| JP | 2014099958 | A | 5/2014 |
| JP | 5556740 | B2 | 7/2014 |
| JP | 2014225955 | A | 12/2014 |
| JP | 2015047042 | A | 3/2015 |
| JP | 2015062326 | A | 4/2015 |
| JP | 2015084634 | A | 4/2015 |
| JP | 5117868 | B2 | 4/2017 |
| JP | 5161044 | B2 | 7/2017 |
| JP | 2018107984 | A | 7/2018 |

* cited by examiner

| VEHICLE ID | CONNECTION DESTINATION ID | PERIOD | POWER TRANSFER AMOUNT | POSITION |
|---|---|---|---|---|
| V100 | C100 | 2018/9/1 11:00 ~ 2018/9/1 11:30 | 3kWh | POSITION 1 |
| V100 | C100 | 2018/9/1 11:30 ~ 2018/9/1 12:00 | 2kWh | POSITION 1 |
| ... | ... | ... | ... | ... |

*FIG. 6*

| VEHICLE ID | PERIOD | POWER TRANSFER AMOUNT | POSITION |
|---|---|---|---|
| V100 | 2018/9/1 11:00 ~ 2018/9/1 11:30 | 3kWh | POSITION 1 |
| V100 | 2018/9/1 11:30 ~ 2018/9/1 12:00 | 2kWh | POSITION 1 |
| ⋮ | ⋮ | ⋮ | ⋮ |

*FIG. 7*

| EVENT PERIOD | EVENT LOCATION | NUMBER OF ATTENDEE | USED POWER AMOUNT | EVENT TYPE |
|---|---|---|---|---|
| (MONTH) (DATE) to (MONTH) (DATE) | ○○○ SITE | ○ | ○kwh | MOTOR SHOW |
| (MONTH) (DATE) | ×× GREEN PARK | × | ×kwh | FIREWORKS DISPLAY |
| . . . | . . . | . . . | . . . | . . . |

FIG. 8

POWER TRANSFER UNIT, AND POWER TRANSFER SYSTEM

The contents of the following Japanese patent application are incorporated herein by reference: 2019-006010 filed on Jan. 17, 2019.

BACKGROUND

1. Technical Field

The present invention relates to a power transfer unit, and a power transfer system.

2. Related Art

Movable fly-wheel energy storage system arrays are known (see Patent Literature 1 explained below, etc., for example).

PRIOR ART LITERATURES

Patent Literatures

Patent Literature 1: Japanese Translation of PCT International Application Publication No. 2007-503191
Patent Literature 2: Japanese Patent No. 6117868
Patent Literature 3: Japanese Patent Application Publication No. 2018-107984
Patent Literature 4: Japanese Patent No. 6161044
Patent Literature 5: Japanese Patent No. 5149753
Patent Literature 6: Japanese Patent No. 5556740

SUMMARY

In a system that performs power transfer between a power network and vehicles having driving power sources, it is not easy cost-wise to provide a large number of facilities for performing power transfer with the power network at a location where vehicles gather.

BRIEF DESCRIPTION OF THE DRAWINGS

FIG. 6 illustrates, in a table format, one example of power transfer information to be sent from the power transfer unit 300 to the managing apparatus 40.
FIG. 7 is one example of measurement value information of a power amount sent from the ECU of a vehicle 30.
FIG. 8 illustrates, in a table format, event information stored in a storage unit 48 of the managing apparatus 40.

DESCRIPTION OF EXEMPLARY EMBODIMENTS

Hereinafter, (some) embodiment(s) of the present invention will be described. The embodiment(s) do(es) not limit the invention according to the claims, and all the combinations of the features described in the embodiment(s) are not necessarily essential to means provided by aspects of the invention. Note that the identical or similar portions in drawings are given the same reference numbers, and repetitive explanations are omitted in some cases.

Figure 1:
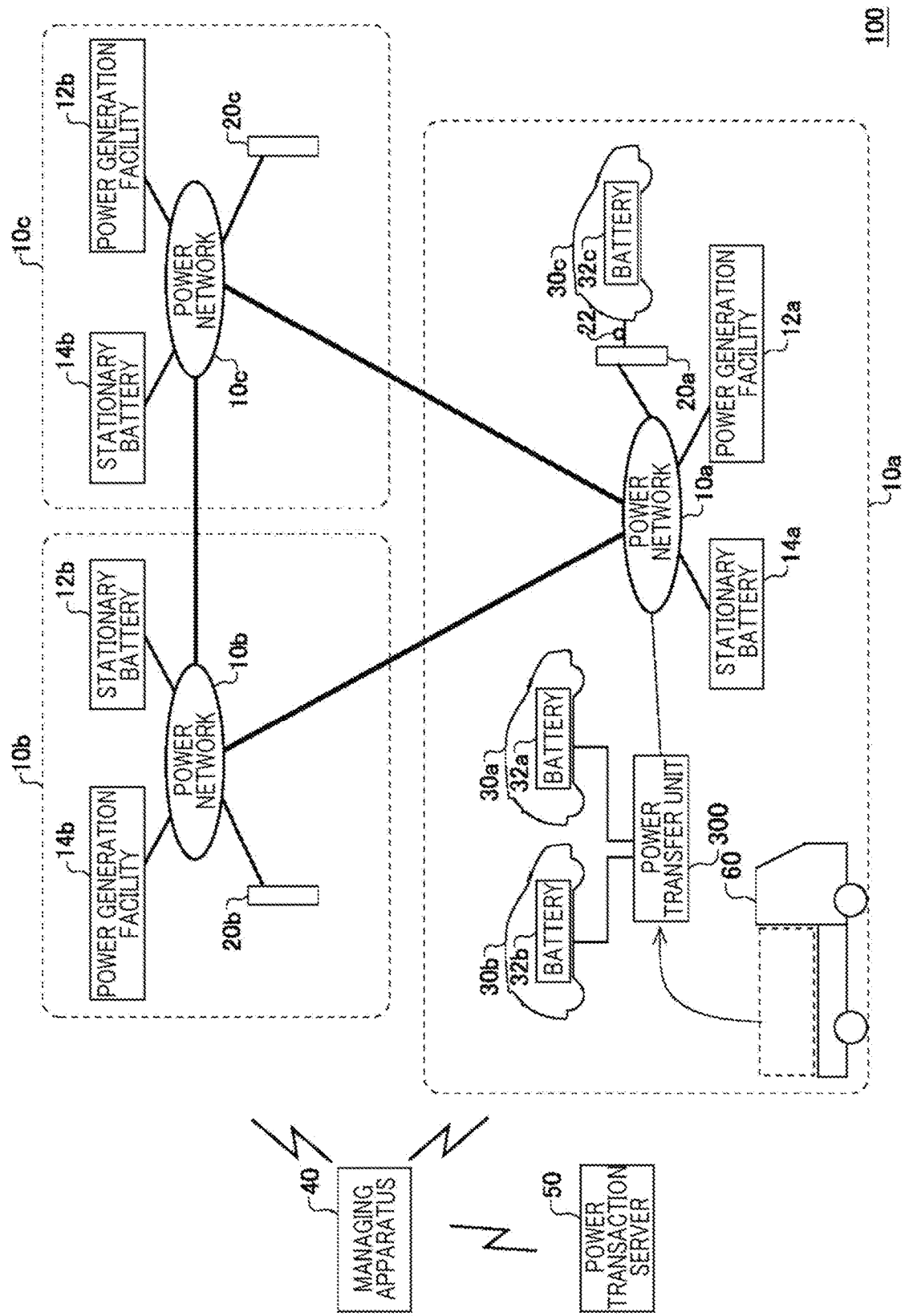
FIG. 1 schematically illustrates the basic configuration of a power transfer system 100.

FIG. 1 schematically illustrates the basic configuration of a power transfer system 100. The power transfer system 100 is a system for a power aggregator, for example, to perform V2G (Vehicle-to-Grid) for exchange of power between vehicles and a power network by using batteries provided to the vehicles. Note that, in V2G, at least either release of power by a vehicle to the power network or reception of power by a vehicle from the power network is performed.

The power transfer system 100 includes: a plurality of vehicles including a vehicle 30a, a vehicle 30b, and a vehicle 30c; a plurality of stationary batteries including a stationary battery 14a, a stationary battery 14b, and a stationary battery 14c; a plurality of charge/discharge facilities including a charge/discharge facility 20a, a charge/discharge facility 20b, and a charge/discharge facility 20c; a plurality of power generation facilities including a power generation facility 12a, a power generation facility 12b, and a power generation facility 12c; a power transfer unit 300; and a managing apparatus 40.

The vehicle 30a includes a battery 32a. The vehicle 30b includes a battery 32b. The vehicle 30c includes a battery 32c. In the present embodiment, the plurality of vehicles including the vehicle 30a, vehicle 30b, and vehicle 30c are generally called a "vehicle 30" in some cases. In addition, a plurality of batteries including the battery 32a, battery 32b, and battery 32c are generally called a "battery 32" in some cases. The battery 32 may be any of various secondary batteries such as lithium ion batteries or nickel hydrogen batteries.

Note that the battery 32 is one example of a driving power source of the vehicle 30. The driving power source includes a power source that, like a fuel cell or the like, consumes a fuel to generate electric energy to be provided to a motive power source of the vehicle 30. The fuel may be hydrogen, a hydrocarbon fuel such as gasoline, light oil or natural gas, an alcohol fuel, or the like. The driving power source may be any power source that can generate electric energy to be provided to a motive power source of the vehicle 30.

The vehicle 30 is one example of a transportation device. The vehicle 30 is a vehicle including a motive power source to be driven by electric energy, such as an electric vehicle or a fuel cell vehicle (FCV), for example. Electric vehicles include a battery electric vehicle (BEV), a hybrid vehicle or plug-in hybrid electric vehicle (PHEV) including an internal combustion engine to provide at least part of motive power. In the present embodiment, the vehicle 30 is an electric vehicle including the battery 32 as a driving power source. In the form employing a battery as a driving power source, battery discharge corresponds to energy release from the driving power source, and battery charge corresponds to energy accumulation in the driving power source.

A power network 10a, a power network 10b, and a power network 10c are power transmission systems or power distribution systems of a power system, or power transmission networks of a power grid. The power network 10a, power network 10b, and power network 10c are generally called a "power network 10" in some cases. The power network 10 may be provided for each region. The power network 10 may be a micro grid. The power network 10 may be a power distribution network of any scale that connects power devices that consume power, and power sources. For example, the power network 10 may be a power distribution network provided to any of facilities such as commercial facilities. The power network 10 may be provided for each building. The power network 10 may be provided for each venue such as an event venue. Power networks 10 may be interconnected by interconnection lines and the like.

The power generation facility 12a supplies power to the power network 10a. The power generation facility 12b supplies power to the power network 10b. The power generation facility 12c supplies power to the power network 10c. The power generation facility 12a, power generation facility 12b, and power generation facility 12c are generally called a "power generation facility 12" in some cases. Power generation facilities 12 are each managed by a power provider such as an electric power company.

The charge/discharge facility 20a is connected to the power network 10a, and charges the battery 32 of the vehicle 30 or causes the battery 32 of the vehicle 30 to discharge power. The charge/discharge facility 20b is connected to the power network 10b, and charges the battery 32 of the vehicle 30 or causes the battery 32 of the vehicle 30 to discharge power. The charge/discharge facility 20c is connected to the power network 10c, and charges the battery 32 of the vehicle 30 or causes the battery 32 of the vehicle 30 to discharge power. The charge/discharge facility 20a, charge/discharge facility 20b, and charge/discharge facility 20c are generally called a "charge/discharge facility 20" in some cases. Charge/discharge facilities 20 include, for example, a charger/discharger installed at a residence, a charge/discharge station installed at a parking lot or public space of a multi-dwelling unit, a building or a commercial facility, and the like. The charge/discharge facility 20 is one example of power transfer facilities for the vehicle 30 to perform power transfer with the power network 10. In addition, the charge/discharge facility 20, and stationary battery 14 are each one example of electric facilities for accumulating energy in the driving power source provided to the vehicle 30.

The stationary battery 14a is connected to the power network 10a, and performs charge/discharge with the power network 10a. The stationary battery 14b is connected to the power network 10b, and performs charge/discharge with the power network 10b. The stationary battery 14c is connected to the power network 10c, and performs charge/discharge with the power network 10c. The stationary battery 14a, stationary battery 14b, and stationary battery 14c are generally called a "stationary battery 14" in some cases.

In each of the power networks 10, the charge/discharge facility 20, stationary battery 14, and power generation facility 12 are capable of power transfer with the power network 10 to which they are connected. The vehicle 30 can move between regions where power is provided by the power networks 10. The vehicle 30 is connected to any of the charge/discharge facilities 20, and can perform charge or discharge of the battery 32.

The managing apparatus 40 is capable of communication with the vehicle 30, stationary battery 14, and power transfer unit 300 through a communication network. The managing apparatus 40 is also capable of communication with a power transaction server 50 through a communication network. The communication networks may include wired communication or wireless communication transmission paths. The communication networks may include communication networks including the Internet, a P2P network, a dedicated line, a VPN, a power line communication line, a mobile phone line, and the like.

The vehicle 30 is connected to the charge/discharge facility 20 through a charge/discharge cable 22. That is, the vehicle 30 is connected to the power network 10 through the charge/discharge cable 22, and charge/discharge facility 20. The vehicle 30 performs power transfer between the battery 32 and the power network 10 through the charge/discharge facility 20. For example, the vehicle 30 releases power obtained by discharge of the battery 32 to the power network 10 via the charge/discharge cable 22, and charge/discharge facility 20. In addition, the vehicle 30 charges the battery 32 with power supplied from the power network 10 via the charge/discharge cable 22, and charge/discharge facility 20. Note that transfer of power between an entity and a power network 10 is called "power transfer with the power network 10" and the like in some cases.

The stationary battery 14 is managed by the power aggregator. The battery 32 of the vehicle 30 forms a virtual power plant along with the stationary battery 14. The managing apparatus 40 is managed by the power aggregator. The managing apparatus 40 controls power transfer between the battery 32 and the power network 10, and between the stationary battery 14 and the power network 10.

The managing apparatus 40 performs power transaction by bidding in a wholesale power market. The power transaction server 50 is managed by an operator of the wholesale power market. The length of each time segment is defined as 30 minutes, and the managing apparatus 40 places a bid in the power transaction server 50 in every time segment. The managing apparatus 40 causes the battery 32, and stationary battery 14 to discharge power in each time segment based on a contract result to supply the power to the power network 10.

For example, the managing apparatus 40 causes the battery 32, and stationary battery 14 to discharge power according to a contract amount which is a result of bidding in the wholesale power market by the power aggregator to supply the power network 10 with the power released from the battery 32, and stationary battery 14. In addition, the managing apparatus 40 controls charge/discharge of the battery 32, and stationary battery 14 to balance power supply and demand in the power network 10 to an extent of the balancing power agreed in a transaction which is a result of bidding in the supply/demand balancing market by the power aggregator. For example, the managing apparatus 40 controls charge/discharge of the battery 32, and stationary battery 14 according to an increased-demand response (increased-DR), a decreased-demand response (decreased-DR), and an increased/decreased-demand response (increased/decreased-DR) requested by a power transmission/distribution company or a retail electricity supplier.

Specifically, the managing apparatus 40 controls at least one of the vehicle 30 and the charge/discharge facility 20 according to a increased-DR to thereby charge the battery 32 of the vehicle 30 with power received from the power network 10 through the charge/discharge facility 20. In addition, the managing apparatus 40 controls at least one of the vehicle 30 and the charge/discharge facility 20 according to a decreased-DR to thereby cause the battery 32 of the vehicle 30 to discharge power, and cause the power obtained by the discharge of the battery 32 to be released toward the power network 10 through the charge/discharge facility 20.

In the present embodiment, the power transfer unit 300 is a power transfer unit that can be transported by a transporting vehicle 60 or the like. The power transfer unit 300 has a plurality of connection ports that can be connected with a charging cable of the vehicle 30. The power transfer unit 300 allows connection of the plurality of vehicles 30 to the power network 10. The managing apparatus 40 communicates with the power transfer unit 300 to control charge/discharge of vehicles 30 connected to the power transfer unit 300.

The managing apparatus 40 acquires event schedule information, past event participant count information, and past power supply/demand information of an event venue to identify a power network 10 that is likely to experience a shortage of power on an event date among the power network 10a, power network 10b, and power network 10c. The managing apparatus 40 generates a schedule for carrying the power transfer unit 300 into an event venue to make deployment of the power transfer unit 300 arranged for. For example, the managing apparatus 40 generates a carry-in schedule for transporting the power transfer unit 300 into the event venue on the day before the event date. The managing apparatus 40 causes power storage devices provided to the power transfer unit 300 to be charged with nighttime electric power, and, on the day of the event, balances power supply and demand in the power network 10 by using the battery 32 of the vehicle 30, and the power storage devices provided to the power transfer unit 300.

The power transfer unit 300 makes it possible to balance power supply and demand of the power network 10 by deploying the power transfer unit 300 at a location such as event venues where vehicles 30 gather temporarily. Thereby, it is possible to reduce reserve power that should be kept in advance in the power network 10.

Note that, in the present embodiment, power transfer between the vehicle 30 and the power network 10 means that power exchange from at least one of the vehicle 30 and the power network 10 to the other occurs. For example, power transfer may mean that power release is performed from the vehicle 30 toward the power network 10. In addition, power transfer may mean that power transmission is performed from the power network 10 toward the vehicle 30. Note that if the vehicle 30 releases power through a charger/discharger installed at a power consumer such as a home, net power supply to the power network 10 does not occur at a connection point between the power consumer's side and the power network 10 when the power consumption on the power consumer's side is greater than the power released from the vehicle 30, and the amount of power supply from the connection point to the power consumer simply decreases in some cases. In this case also, it can be considered that power exchange has occurred with the outside of the power network 10 from the perspective of the power network 10. Accordingly, it does not matter in the present embodiment whether or not the power network 10 receives net power from a particular connection point between the power network 10 and the vehicle 30 in power transfer with the power network 10 in which the vehicle 30 releases power.

Figure 2:
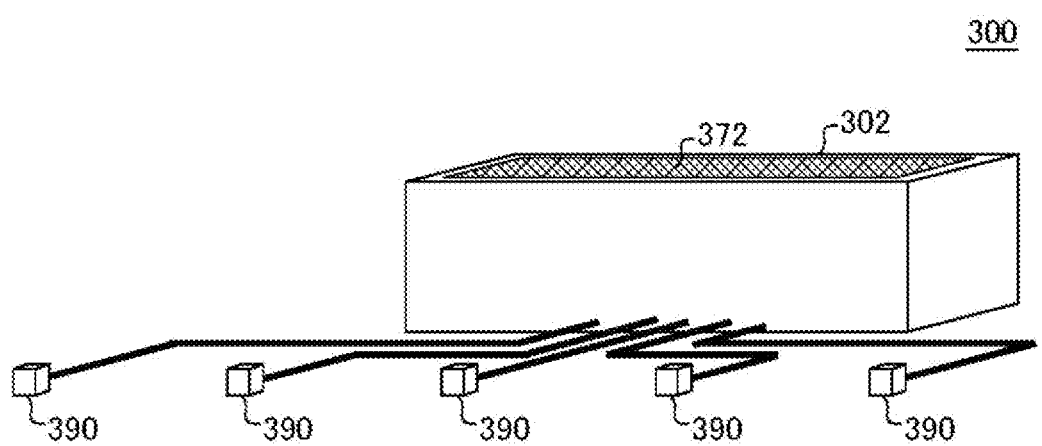
FIG. 2 schematically illustrates the appearance of a power transfer unit 300.

FIG. 2 schematically illustrates the appearance of the power transfer unit 300. The power transfer unit 300 has a main-body portion 302, and a plurality of connecting portions 390. The main-body portion 302 includes a solar photoelectric generating device 372. The solar photoelectric generating device 372 is one example of power generating devices. Examples of the power generating devices include natural energy power generating devices other than solar photoelectric generating devices, and power generating devices such as fuel cells that generate electric energy by consuming fuel.

The plurality of connecting portions 390 are attachable to and detachable from each of the plurality of vehicles 30, and are used for power transmission between the power transfer unit 300 and each of the plurality of vehicles 30. For example, each of the plurality of connecting portions 390 is electrically connected to one vehicle 30. For example, the connecting portions 390 may have insertion ports to which connectors of charge/discharge cables are inserted. In addition, the connecting portions 390 may have connectors to be inserted into insertion ports of charging cables provided to vehicles 30.

Figure 3:
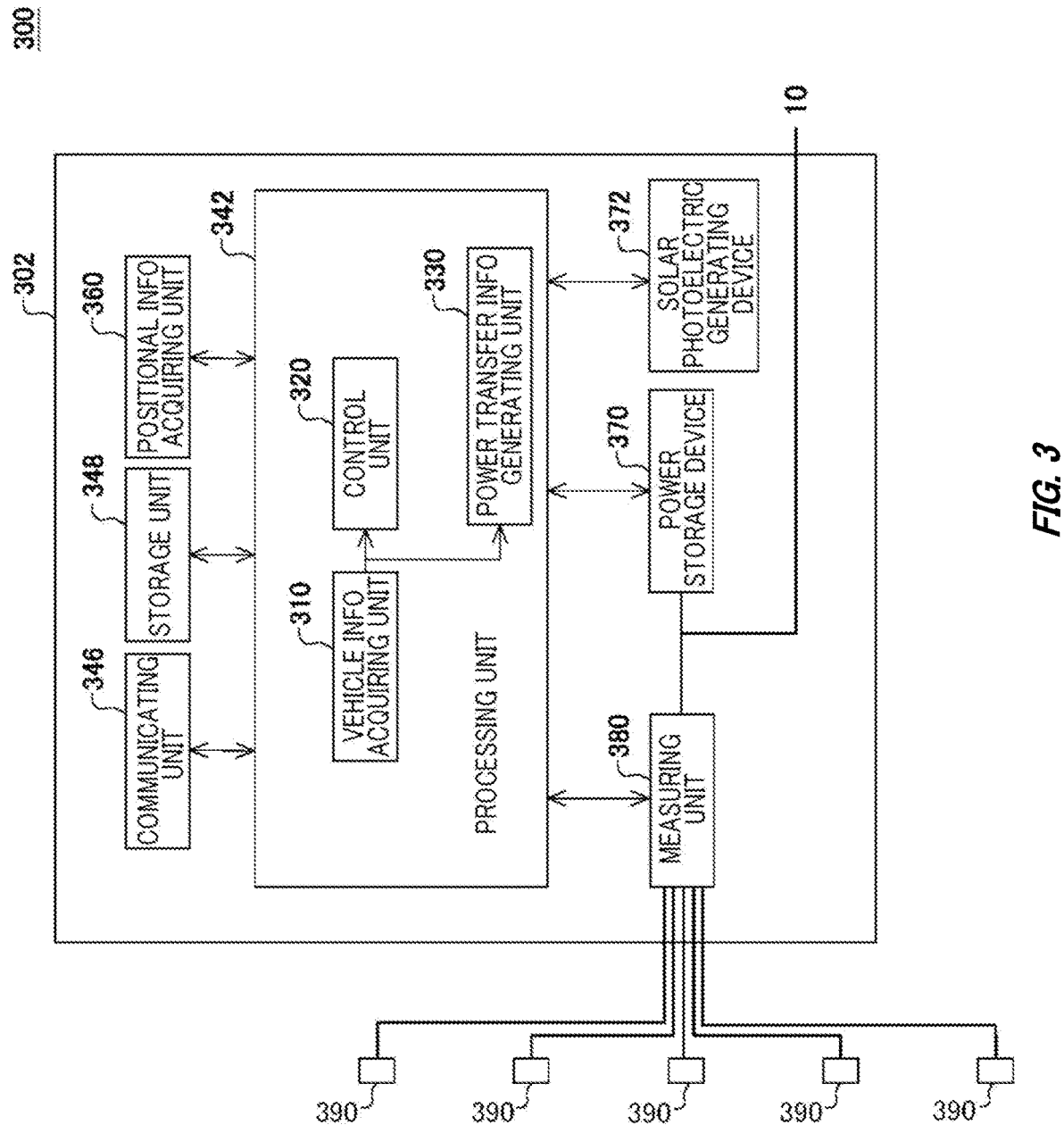
FIG. 3 schematically illustrates the functional configuration of the power transfer unit 300.

FIG. 3 schematically illustrates the functional configuration of the power transfer unit 300. The power transfer unit 300 is a carriable apparatus that can be used for bidirectional power transmission between the power network 10 and each of the plurality of vehicles 30. The main-body portion 302 of the power transfer unit 300 includes a processing unit 342, a storage unit 348, a communicating unit 346, a positional information acquiring unit 360, a measuring unit 380, and a power storage device 370.

The power storage device 370 may be any battery such as a lithium ion battery, a nickel hydrogen battery or a lead storage battery. The power storage device 370 converts power supplied from the power network 10 or a vehicle 30 into DC power, and accumulates the DC power as electric energy in the battery portion. In addition, the electric energy stored in the battery portion of the power storage device 370 can be converted into AC power, and the AC power can be supplied to the power network 10 or a vehicle 30. The power storage device 370 is one example of energy accumulating units that accumulate energy by using electric energy supplied from at least one of the power network 10 and the plurality of vehicles 30.

The measuring unit 380 measures an amount of power transmitted between the power transfer unit 300 and each of the plurality of vehicles 30 through the plurality of connecting portions 390. Information indicating the transmission power amount measured by the measuring unit 380 is output to the processing unit 342.

The processing unit 342 is realized by a processing device including a processor. The storage unit 348 is realized by nonvolatile and volatile storage devices. The processing unit 342 performs processes by using information stored in the storage unit 348. The communicating unit 346 is responsible for communication between the vehicles 30 and the managing apparatus 40. Information that the communicating unit 346 received from the vehicles 30, and managing apparatus 40 is supplied to the processing unit 342. In addition, information to be sent to the vehicles 30, and managing apparatus 40 is generated by the processing unit 342, and sent via the communicating unit 346.

The processing unit 342 includes a vehicle information acquiring unit 310, a control unit 320, and a power transfer information generating unit 330. The control unit 320 controls bidirectional power transmission between the power network 10 and each of the plurality of vehicles 30. For example, the control unit 320 maintains power to be supplied from the power network 10 to each of the vehicle 30 through each of the connecting portions 390 at a predetermined value. In addition, the control unit 320 controls power transfer between the power storage device 370 and each of the power network 10, and plurality of vehicles 30. The control unit 320 controls power supply from the solar photoelectric generating device 372 to at least any of the plurality of vehicles 30, and power network 10.

The control unit 320 controls power transfer between the power network 10 and each of the vehicles 30 based on the remaining capacity of each of the batteries 32 provided to the vehicles 30, and power demand in the power network 10. For example, the control unit 320 controls power transfer between the power network 10 and each of the vehicles 30 such that differences among the remaining capacities of the batteries 32 are reduced, based on the remaining capacity accumulated in each of the batteries 32, and power demand in the power network 10. For example, the control unit 320 may control power transfer between the power network 10 and each of the vehicles 30 such that differences among differences between the remaining capacities of the batteries 32 and a predetermined reference value are reduced.

The vehicle information acquiring unit 310 acquires each piece of identification information of the plurality of vehicles 30 connected to the plurality of connecting portions 390. For example, the vehicle information acquiring unit 310 may acquire identification information sent from the ECU of a vehicle 30 through power line communication or wireless communication.

The power transfer information generating unit 330 generates power transfer information that associates each piece of identification information of the plurality of vehicles 30 acquired by the vehicle information acquiring unit 310 with the amount of power transmission between the power transfer unit 300 and a vehicle 30 identified with the piece of the identification information.

The positional information acquiring unit 360 acquires information indicating a position of the power transfer unit 300. For example, the positional information acquiring unit 360 uses a GPS function to acquire information about the latitude and longitude of the position where the power transfer unit 300 is at. The power transfer information generating unit 330 may generate power transfer information that associates each piece of identification information of the plurality of vehicles 30 acquired by the vehicle information acquiring unit 310 further with positional information.

The power transfer information generating unit 330 may generate power transfer information that associates each piece of identification information of the plurality of vehicles 30 acquired by the vehicle information acquiring unit 310 further with information indicating a period during which power was transmitted between the power transfer unit 300 and a vehicle 30 identified with the piece of the identification information. The power transfer information generated by the power transfer information generating unit 330 is sent to the external managing apparatus 40 by the communicating unit 346.

The power transfer unit 300 makes it possible to move the power transfer unit 300 to an event venue or the like to cause power transfer to be performed between the power network 10 and a number of vehicles 30 that gathered at the event venue. Thereby, it is possible to lower the possibility that a shortage of power occurs in the power network that supplies power at the event venue or in a power source of the event venue.

Figure 4:
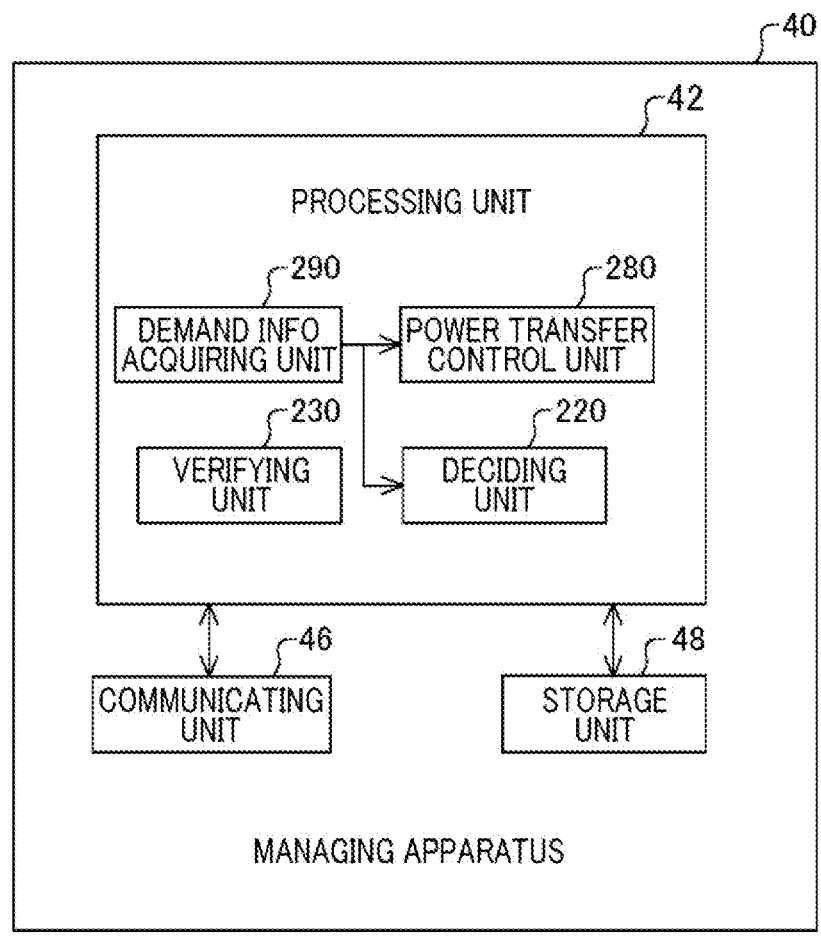
FIG. 4 schematically illustrates the functional configuration of a managing apparatus 40.

FIG. 4 schematically illustrates the functional configuration of the managing apparatus 40. The managing apparatus 40 includes a processing unit 42, a storage unit 48, and a communicating unit 46.

The processing unit 42 is realized by a processing device including a processor. The storage unit 48 is realized by nonvolatile and volatile storage devices. The processing unit 42 performs processes by using information stored in the storage unit 48. The communicating unit 46 is responsible for communication with the vehicle 30, stationary battery 14, power transfer unit 300, and power transaction server 50. Information received by the communicating unit 46 from the vehicle 30, stationary battery 14, power transfer unit 300, and power transaction server 50 is supplied to the processing unit 42. In addition, information to be sent to the vehicle 30, stationary battery 14, power transfer unit 300, and power transaction server 50 is generated by the processing unit 42, and sent via the communicating unit 46.

The managing apparatus 40 may be a system realized by one information processing device, or may be a system realized by a plurality of information processing devices.

The processing unit 42 includes a power transfer control unit 280, a demand information acquiring unit 290, a deciding unit 220, and a verifying unit 230.

The demand information acquiring unit 290 acquires information indicating power demand in the power network 10. The deciding unit 220 decides a deployment destination of the power transfer unit 300 based on power demand in power networks 10. For example, if there is an event at an event venue to which power is supplied from the power network 10a, the deciding unit 220 refers to the power capacity of the power generation facility 12a, and an amount of power consumed at the event venue when the same event was held in the past, and if it is predicted that a shortage of power will occur in the power network 10, the deciding unit 220 decides the event venue as a deployment destination of the power transfer unit 300.

The deciding unit 220 may predict the number of vehicles 30 to visit the event venue based on the predicted value of the event participant count, and may decide the number of power transfer units 300 to be deployed at the event venue based on the predicted number.

The power transfer control unit 280 causes power transfer to be performed between the vehicles 30 and the power network 10 according to the power demand in the power network 10. For example, the power transfer control unit 280 communicates with the ECU of the vehicle 30 to successively acquire power transferability information indicating whether or not the vehicle 30 is connected to a charge/discharge facility 20 available for power transfer with the power network 10. If the vehicle 30 is available for power transfer with the power network 10, the power transfer control unit 280 instructs the ECU provided to the vehicle 30 to perform charge/discharge of the battery 32 according to power demand indicated by information acquired by the demand information acquiring unit 290. The ECU of the vehicle 30 communicates with the charge/discharge facility 20 according to the instruction of the power transfer control unit 280, and controls a power converter of the vehicle 30 to perform charge of the battery 32 through the charge/discharge facility 20 or release of power obtained through discharge of the battery 32. Note that the power transfer control unit 280 may successively acquire, from the ECU of the vehicle 30, information indicating: an amount of power input from the charge/discharge facility 20 to the power converter at the time of charge of the battery 32; an amount of power output from the power converter to the charge/discharge facility 20 at the time of discharge of the battery 32; and the SOC (State of Charge) of the battery 32. The power transfer control unit 280 may control power transfer between the vehicle 30 and the power network 10 based on the information acquired from the ECU of the vehicle 30.

Note that the contract amount in power transaction mentioned above is one example of the information indicating the power demand. The information indicating the power demand may be a contract price in power transaction or a contract type indicating whether a transaction is a buy contract or a sell contract. In addition, the information indicating the power demand may be information indicating an amount of real-time imbalance between supply and demand in the power network 10 or may be information indicating a predicted value of an amount of future imbalance between supply and demand. The information indicating the power demand may be information indicating a real-time power consumption amount of the power consumer in the power network 10 or a predicted value of the power consumption. Information that can be applied to the information indicating the power demand is not limited to power amounts themselves, but include various types of information that directly or indirectly affects power demand such as temperature information, humidity information, weather information, or traffic amount information.

Note that examples of the power transaction market include transaction markets such as a day-ahead market, an intraday market, and a supply/demand balancing power market. Forms that can be applied as the transaction form of power transaction include various transaction forms other than the transaction forms in these power transaction markets.

Note that the ECU of the vehicle 30 sends, to the managing apparatus 40, information indicating an amount of power supplied from the battery 32 to the outside of the vehicle 30, and a measurement value of an amount of power supplied from the outside of the vehicle 30 to the battery 32. The power amount may be measured by a power amount sensor provided to the battery 32. In addition, the ECU of the vehicle 30 sends, to the managing apparatus 40, information indicating a position measured by a GPS sensor provided to the vehicle 30.

Based on the measurement value information sent from the ECU of the vehicle 30 to the managing apparatus 40, and the power transfer information sent from the power transfer unit 300, the verifying unit 230 verifies the power amount measured at the vehicle 30, and the power amount measured by the power transfer unit 300.

Figure 5:
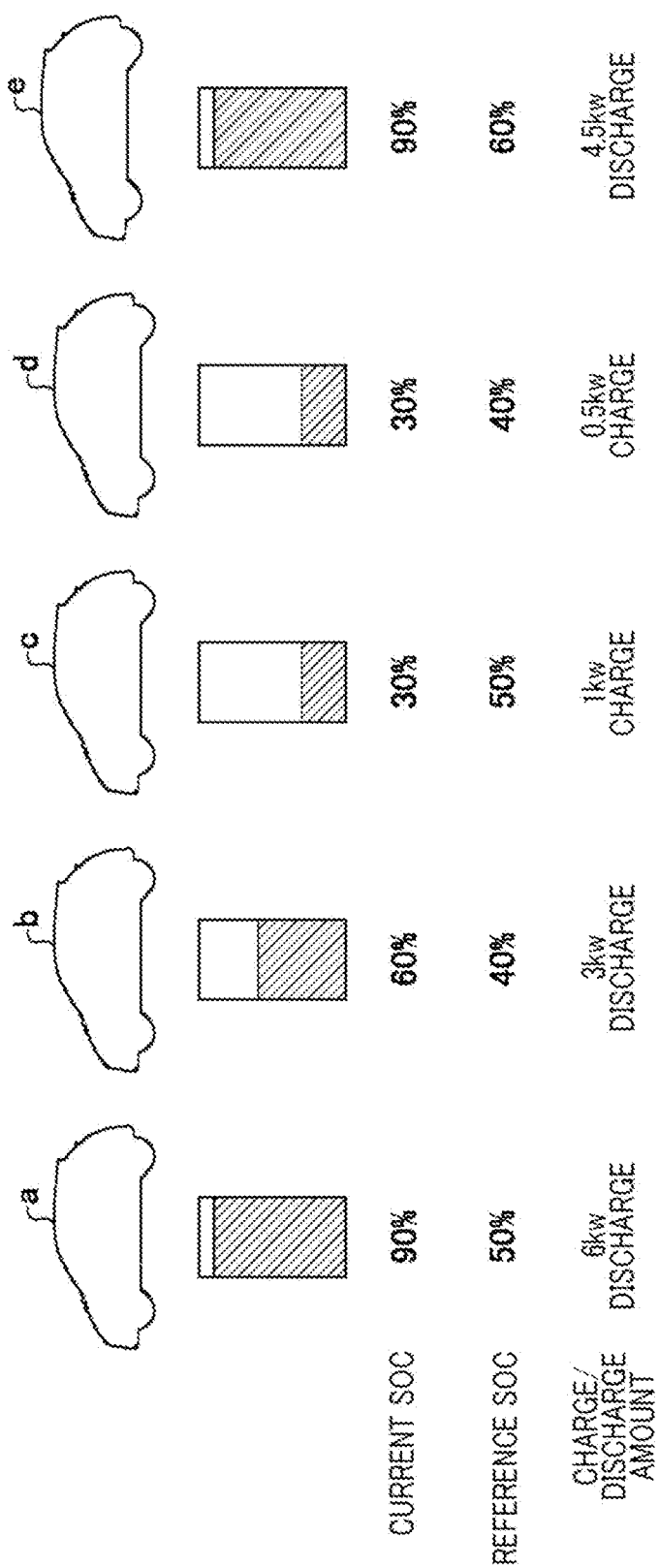
FIG. 5 schematically illustrates one example of charge/discharge control of a battery 32 by a control unit 320.

FIG. 5 schematically illustrates one example of charge/discharge control of the battery 32 by the control unit 320. Here, for convenience of explanation, it is assumed that five vehicles a to e are connected to the power transfer unit 300. It is assumed that the vehicles a to e have the same configuration as the configuration of the vehicle 30.

The current SOCs of batteries 32 of the vehicles a to e are assumed to be 90%, 60%, 30%, 30%, and 90%, respectively. In addition, the reference SOCs of the batteries 32 of the vehicles a to e are 50%, 40%, 50%, 40%, and 60%, respectively. Different reference SOCs may be set vehicle by vehicle. The reference SOCs may be set by users of the vehicles. For a vehicle for which a reference SOC is not set, the control unit 320 may apply a default value (e.g., 50%) as the reference SOC of the vehicle.

For each of the vehicles, the control unit 320 decides the charge amount, and discharge amount of the battery 32 based on the difference between the current SOC and reference SOC of the battery 32. For example, the control unit 320 selects, as a discharge target battery 32, a battery 32 whose current SOC is higher than the reference SOC, and selects, as a charge target battery 32, a battery 32 whose current SOC is lower than the reference SOC.

The control unit 320 adjusts the discharged power of each battery 32 based on the difference between the current SOC and the reference SOC. For example, the control unit 320 changes the discharged power of each battery 32 in proportion to the difference between the current SOC and the reference SOC. Specifically, the control unit 320 determines the discharged power of the battery 32 of the vehicle a as 6 kW, the discharged power of the battery 32 the vehicle b as 3 kW, and the discharged power of the battery 32 of the vehicle e as 4.5 kW.

In addition, the control unit 320 adjusts the charged power of each battery 32 based on the difference between the reference SOC and the current SOC. For example, the control unit 320 changes the charged power of each battery 32 in proportion to the difference between the reference SOC and the current SOC. Specifically, the control unit 320 determines the charged power of the battery 32 of the vehicle c as 1 kW, and the charged power of the battery 32 of the vehicle d as 0.5 kW.

With the adjustment of discharged power and charged power in this manner, net power of 12 kW is generated through exchange of power among vehicles through the power transfer unit 300. The control unit 320 causes the net power of 12 kW generated from the vehicles a to e to be output to the power network 10. Note that if power demand in the power network 10 is lower than a predetermined value, the control unit 320 charges the power storage device 370 with at least part of the net power of 12 kW generated. Thereby, the control unit 320 can control power transfer between vehicles and the power network 10 so as to reduce differences among the remaining capacities of the batteries 32 of the vehicles. Since the power transfer unit 300 makes possible direct exchange of power of the batteries 32 between the vehicles, it is possible to reduce energy loss as compared with cases where power charge and discharge are performed through the power network 10.

FIG. 6 illustrates, in a table format, one example of power transfer information to sent from the power transfer unit 300 to the managing apparatus 40. The power transfer information is generated by the power transfer information generating unit 330. The power transfer information associates a vehicle ID, a connection destination ID, a period, a power transfer amount, and a position with each other.

As the vehicle ID, identification information that the vehicle information acquiring unit 310 acquired from a vehicle 30 is stored. As the connection destination ID, identification information of the power transfer unit 300 is stored. As the period, information indicating a period during which the measuring unit 380 measured a power amount is stored. For example, if the measuring unit 380 measures a 30-minutes value of a power amount, the period of 30 minutes is stored. Note that the period information, and connection destination ID are one example of information indicating a period during which power was transmitted between a vehicle 30 and the power transfer unit 300.

As the power transfer amount, information indicating an amount of power transferred between a vehicle 30 and the power transfer unit 300 in a corresponding period is stored. The power transfer amount may be a 30-minutes value of an amount of power transmitted between the vehicle 30 and the power transfer unit 300. Note that if power is supplied from the vehicle 30 to the power transfer unit 300, a negative value is stored as the power transfer amount. If power is supplied from the power transfer unit 300 to the vehicle 30, a positive value is stored as the power transfer amount. As the position, positional information acquired by the positional information acquiring unit 360 is stored.

FIG. 7 is one example of measurement value information of a power amount sent from the ECU of a vehicle 30. The measurement value information associates a vehicle ID, a period, a power transfer amount, and a position with each other.

As the vehicle ID, identification information of a vehicle 30 stored in the ECU of the vehicle 30 is stored. As the period, information indicating a period during which a power amount is measured by a power amount sensor of the battery 32 is stored. For example, if the power amount sensor of the battery 32 measures a 30-minutes value of a power amount, the period of 30 minutes is stored. As the power transfer amount, the power amount measured by the power amount sensor of the battery 32 is stored. As the position, positional information acquired by a GPS sensor provided to the vehicle 30 is stored.

The verifying unit 230 verifies whether or not the power amount measured at the vehicle 30, and the power amount measured by the power transfer unit 300 match, based on the power transfer information acquired from the power transfer unit 300, and the measurement value information of the power amount received from the ECU of the vehicle 30. For example, if there is a combination of pieces of data in the power transfer information from the power transfer unit 300, and the measurement value information from the vehicle 30, which pieces of data including: matching vehicle IDs; and periods, positions, and power transfer amounts that match with each other within a predetermined error range, the verifying unit 230 determines that the power amount measured at the vehicle 30, and the power amount measured by the power transfer unit 300 match. Thereby, it is possible to properly calculate an electricity fee according to the amount of transferred power to be billed to the owner of a vehicle 30 or the operator of an event venue.

FIG. 8 illustrates, in a table format, event information stored in the storage unit 48 of the managing apparatus 40. The storage unit 48 stores an event period, event location, number of attendees, amount of power used, and event type of an event held in the past.

The managing apparatus 40 acquires information about events to be held in the future from an event operating company or promoter. The deciding unit 220 calculates predicted values of amounts of power to be used in the events to be held in the future, based on the future event information, and past event information stored in the storage unit 48. The deciding unit 220 decides whether to or not to deploy the power transfer unit 300 at each event venue based on: the predicted value of the amounts of power to be used at the events to be held in the future; power supply capacities of power networks 10 that supply power to event locations of the events; temperature information about regions including the event locations of the events; and the like.

As explained above, the power transfer unit 300 makes it possible to transport in advance the power transfer unit 300 to a location where a large number of vehicles 30 gather temporarily for reasons such as an event, and deploy the power transfer unit 300 at the location. Thereby, power supply/demand in power networks 10 can be balanced. This reduces reserve power that should be kept in the power networks 10, and at the same time contributes to stabilization of the power networks 10.

Note that in the embodiment explained above, the power transfer unit 300 is deployed mainly at an event venue and the like. However, the deployment destination of the power transfer unit 300 may be a downtown parking lot or commercial facility. In addition, the power transfer unit 300 can be used also as a power source at the time of disaster or at the time of emergency.

Figure 9:
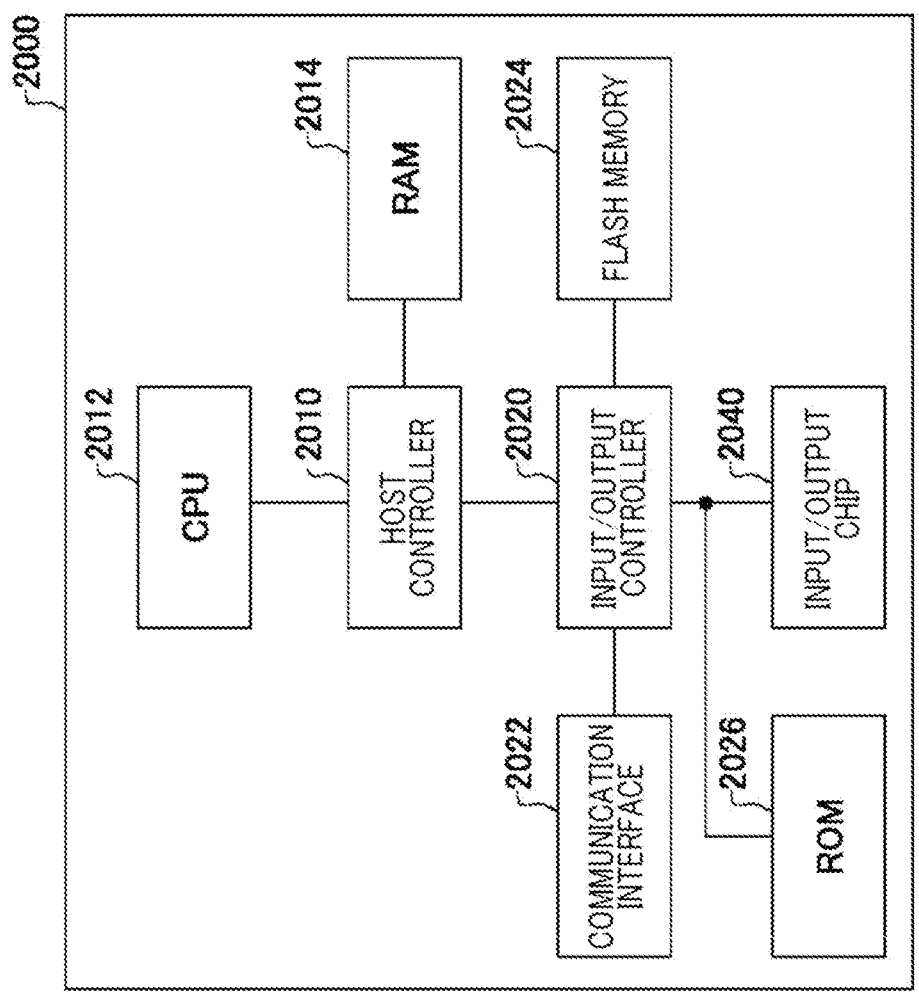
FIG. 9 shows an example of a computer 2000 in which embodiments of the present invention may be wholly or partly embodied.

FIG. 9 shows an example of a computer 2000 in which embodiments of the present invention may be wholly or partly embodied. A program that is installed in the computer 2000 can cause the computer 2000 to function as or perform operations associated with apparatuses such as the managing apparatus 40 of the embodiments or sections thereof, and/or cause the computer 2000 to perform processes of the embodiments of the present invention or steps thereof. Such a program may be executed by the CPU 2012 to cause the computer 2000 to perform certain operations associated with some or all of the blocks of flowcharts and block diagrams described herein.

The computer 2000 according to the present embodiment includes a CPU 2012, and a RAM 2014, which are mutually connected by a host controller 2010. The computer 2000 also includes a ROM 2026, a flash memory 2024, a communication interface 2022, and an input/output chip 2040. The ROM 2026, the flash memory 2024, the communication interface 2022, and the input/output chip 2040 are connected to the host controller 2010 via the input/output controller 2020.

The CPU 2012 operates according to programs stored in the ROM 2026 and the RAM 2014, thereby controlling each unit.

The communication interface 2022 communicates with other electronic devices via a network. The flash memory 2024 stores programs and data used by the CPU 2012 within the computer 2000. The ROM 2026 stores therein a boot program or the like executed by the computer 2000 at the time of activation, and/or a program depending on the hardware of the computer 2000. The input/output chip 2040 may also connect various input/output units such as a keyboard, a mouse and a monitor to the input/output controller 2020 via an input/output port such as a serial port, a parallel port, a keyboard port, a mouse port, a monitor port, a USB port, an HDMI (registered trademark) port and the like.

A program is provided via a computer-readable medium such as a CD-ROM, a DVD-ROM, or a memory card or a network. The RAM 2014, the ROM 2026, or the flash memory 2024 is an example of the computer-readable medium. The program is installed in the flash memory 2024, the RAM 2014, or the ROM 2026, and is executed by the CPU 2012. The information processing described in these programs is read into the computer 2000, resulting in cooperation between a program and the above-mentioned various types of hardware resources. An apparatus or method may be constituted by realizing the operation or processing of information in accordance with the usage of the computer 2000.

For example, when communication is performed between the computer 2000 and an external device, the CPU 2012 may execute a communication program loaded onto the RAM 2014 to instruct communication processing to the communication interface 2022, based on the processing described in the communication program. The communication interface 2022, under control of the CPU 2012, reads transmission data stored on a transmission buffering region provided in a recording medium such as the RAM 2014, the hard disk drive 2024, the DVD-ROM 2001, or the IC card, and transmits the read transmission data to a network or writes reception data received from a network to a reception buffering region or the like provided on the recording medium.

In addition, the CPU 2012 may cause all or a necessary portion of a file or a database to be read into the RAM 2014, the file or the database having been stored in an external recording medium such as the flash memory 2024, and perform various types of processing on the data on the RAM 2014. The CPU 2012 may then write back the processed data to the external recording medium.

Various types of information, such as various types of programs, data, tables, and databases, may be stored in the recording medium to undergo information processing. The CPU 2012 may perform various types of processing on the data read from the RAM 2014, which includes various types of operations, processing of information, condition judging, conditional branch, unconditional branch, search/replace of information, etc., as described throughout this disclosure and designated by an instruction sequence of programs, and writes the result back to the RAM 2014. In addition, the CPU 2012 may search for information in a file, a database, etc., in the recording medium. For example, when a plurality of entries, each having an attribute value of a first attribute associated with an attribute value of a second attribute, are stored in the recording medium, the CPU 2012 may search for an entry matching the condition whose attribute value of the first attribute is designated, from among the plurality of entries, and read the attribute value of the second attribute stored in the entry, thereby obtaining the attribute value of the second attribute associated with the first attribute satisfying the predetermined condition.

The program or software module explained above may be stored on the computer 2000 or a computer-readable medium located near the computer 2000. A recording medium like a hard disk or a RAM provided in a server system connected to a dedicated communication network or the Internet can be used as such a computer-readable medium. The program stored on the computer-readable medium may be provided to the computer 2000 via a network.

The programs that are installed on the computer 2000, and make the computer 2000 function as the managing apparatus 40 may act on the CPU 2012 or the like to make the computer 2000 function as each unit of the managing apparatus 40. Information processing described in these programs are read in by the computer 2000 to thereby make the computer 2000 function as the power transfer control unit 280, demand information acquiring unit 290, deciding unit 220, and verifying unit 230, which are specific means attained by cooperation between software and various types of hardware resources mentioned above. With these specific means, the unique managing apparatus 40 corresponding to a purpose of use of the computer 2000 in the present embodiment can be constructed by realizing operations on or processing of information corresponding to the purpose of use.

Various embodiments of the present invention may be described with reference to block diagrams and the like whose blocks may represent (1) steps of processes in which operations are performed or (2) sections of apparatuses responsible for performing operations. Certain steps and sections may be implemented by dedicated circuitry, programmable circuitry supplied with computer-readable instructions stored on computer-readable media, and/or processors supplied with computer-readable instructions stored on computer-readable media. Dedicated circuitry may include digital and/or analog hardware circuits and may include integrated circuits (IC) and/or discrete circuits. Programmable circuitry may include reconfigurable hardware circuits comprising logical AND, OR, XOR, NAND, NOR, and other logical operations, flip-flops, registers, memory elements, etc., such as field-programmable gate arrays (FPGA), programmable logic arrays (PLA), etc.

Computer-readable media may include any tangible device that can store instructions for execution by a suitable device, such that the computer-readable medium having instructions stored therein comprises at least part of an article of manufacture including instructions which can be executed to create means for performing operations specified in the flowcharts or block diagrams. Examples of computer-readable media may include an electronic storage medium, a magnetic storage medium, an optical storage medium, an electromagnetic storage medium, a semiconductor storage medium, etc. More specific examples of computer-readable media may include a floppy disk, a diskette, a hard disk, a random access memory (RAM), a read-only memory (ROM), an erasable programmable read-only memory (EPROM or Flash memory), an electrically erasable programmable read-only memory (EEPROM), a static random access memory (SRAM), a compact disc read-only memory (CD-ROM), a digital versatile disk (DVD), a BLU-RAY (registered trademark) disc, a memory stick, an integrated circuit card, etc.

Computer-readable instructions may include assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, JAVA (registered trademark), C++, etc., and conventional procedural programming languages, such as the "C" programming language or similar programming languages.

Computer-readable instructions may be provided to a processor of a general purpose computer, special purpose computer, or other programmable data processing device, or to programmable circuitry, locally or via a local area network (LAN), wide area network (WAN) such as the Internet, etc., to execute the computer-readable instructions to create means for performing operations specified in the flowcharts or block diagrams. Examples of processors include computer processors, processing units, microprocessors, digital signal processors, controllers, microcontrollers, etc.

While the embodiments of the present invention have been described, the technical scope of the invention is not limited to the above described embodiments. It is apparent to persons skilled in the art that various alterations and improvements can be added to the above-described embodiments. In addition, matters explained about a particular embodiment can be applied to another embodiment as long as such application does not cause technological contradictions. It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

EXPLANATION OF REFERENCE SYMBOLS

10: power network
12: power generation facility
14: stationary battery
20: charge/discharge facility
22: charge/discharge cable
30: vehicle
32: battery
40: managing apparatus
42: processing unit
46: communicating unit
48: storage unit
50: power transaction server 60: transporting vehicle
100: power transfer system
220: deciding unit
230: verifying unit
280: power transfer control unit
290: demand information acquiring unit
300: power transfer unit
302: main-body portion
310: vehicle information acquiring unit
320: control unit
330: power transfer information generating unit
342: processing unit
346: communicating unit
348: storage unit
360: positional information acquiring unit
370: power storage device
372: solar photoelectric generating device
380: measuring unit
390: connecting portion
2000: computer
2010: host controller
2012: CPU
2014: RAM
2020: input/output controller
2022: communication interface
2024: flash memory
2026: ROM
2040: input/output chip

What is claimed is:

1. A power transfer system comprising:
a carriable power transfer unit that can be used for bidirectional power transmission between
a power network and each of
a plurality of vehicles provided with
driving power sources; and
an external managing apparatus,
wherein the power transfer unit comprises:
a main body portion;
a plurality of connecting portions extending from the main body portion that are attachable to and detachable from each of the plurality of vehicles, and
are used for power transmission between the power transfer unit and each of the plurality of vehicles;
a control unit that controls bidirectional power transmission between the power network and each of the plurality of vehicles;
a measuring unit that measures a transmission power amount of power transmitted between the power transfer unit and each of the plurality of vehicles through the plurality of connecting portions;
a vehicle information acquiring unit that acquires each piece of identification information of the plurality of vehicles connected to the plurality of connecting portions;
a power transfer information generating unit that generates power transfer information that associates each piece of the identification information of the plurality of vehicles acquired by the vehicle information acquiring unit with the transmission power amount of power transmitted between the power transfer unit and a vehicle identified with the piece of the identification information;
a power transfer information sending unit that sends the power transfer information to the external managing apparatus, and the external managing apparatus receives, from each of the plurality of vehicles, measurement value information that includes information indicating a measurement value of an amount of power supplied from the driving power source to an outside of the vehicle and a measurement value of an amount of power supplied from an outside of the vehicle to the driving power source, and the identification information, the external managing apparatus comprises a verifying unit that verifies whether or not the power amount measured at each of the plurality of vehicles and the transmission power amount measured by the power transfer unit match, based on the power transfer information sent from the power transfer unit, and the measurement value information, and the external managing apparatus further comprises: a demand information acquiring unit that acquires information that indicates a power demand in a plurality of power networks; and a deciding unit that decides a deployment destination of the power transfer unit based on the power demand in the plurality of power networks; wherein the deciding unit performs a comparison of a power capacity of a power generation facility with an amount of power consumed in the past, the power generation facility transferring power to one of the plurality of power networks; performs a prediction as to whether a shortage of power in the one of the plurality of power networks will occur based on the comparison of the power capacity of the power generation facility with the amount of power consumed in the past; and decides, based on the prediction of the shortage of power in the one of the plurality of power networks, the deployment destination of the power transfer unit.

2. The power transfer system according to claim 1, wherein the power transfer unit further comprising a positional information acquiring unit that acquires positional information that indicates a position of the power transfer unit, wherein
the power transfer information associates each piece of the identification information of the plurality of vehicles acquired by the vehicle information acquiring unit further with the positional information.

3. The power transfer system according to claim 1, wherein the power transfer information associates each piece of the identification information of the plurality of vehicles acquired by the vehicle information acquiring unit further with information that indicates a period during which power has been transmitted between the power transfer unit and a vehicle identified with the piece of the identification information.

4. The power transfer system according to claim 1, wherein the control unit controls power transfer between the power network and each of the plurality of vehicles based on an amount of energy accumulated in each of a plurality of the driving power sources provided to the plurality of vehicles, and power demand in the power network.

5. The power transfer system according to claim 4, wherein the control unit controls power transfer between the power network and each of the plurality of vehicles based on an amount of energy accumulated in each of the plurality of driving power sources, and power demand in the power network such that differences between amounts of energy accumulated in the plurality of driving power sources decrease.

6. The power transfer system according to claim 1, wherein the power transfer unit further comprising an energy accumulating unit that accumulates energy by using electric energy supplied from at least one of the power network and the plurality of vehicles.

7. The power transfer system according to claim 6, wherein the control unit further controls power transfer between the energy accumulating unit and each of the power network and the plurality of vehicles.

8. The power transfer system according to claim 1, wherein the power transfer unit further comprising a power generating device provided to be able to supply power to the plurality of vehicles, and the power network, wherein
 the control unit further controls power supply from the power generating device to at least any of the plurality of vehicles and the power network.

\* \* \* \* \*